United States Patent [19]

Tornberg

[11] Patent Number: 4,739,792
[45] Date of Patent: Apr. 26, 1988

[54] VALVE

[75] Inventor: Jouko Tornberg, Vantaa, Finland

[73] Assignee: Neles OY, Helsinki, Finland

[21] Appl. No.: 29,729

[22] Filed: Mar. 24, 1987

[51] Int. Cl.⁴ .............................................. F16K 27/06
[52] U.S. Cl. .................................... 137/315; 251/314; 251/360
[58] Field of Search ............... 251/314, 315, 316, 360; 137/315

[56] References Cited

U.S. PATENT DOCUMENTS 4,399,976 8/1983 Legris ............................. 251/315 X
4,467,823 8/1984 Shaffer et al. .................. 177/315 X Primary Examiner—A. Michael Chambers
Assistant Examiner—John C. Fox
Attorney, Agent, or Firm—Cushman, Darby & Cushman

[57] ABSTRACT

A valve consists of a housing provided with a closing opening, a closing member shaped as a part of a ball face, fitted turnably in the housing and resiliently connected to a pivot shaft, and of an annular sealing face. The closing member is connected to its pivot shaft by a resilient member mounted on the pivot shaft.

3 Claims, 4 Drawing Sheets

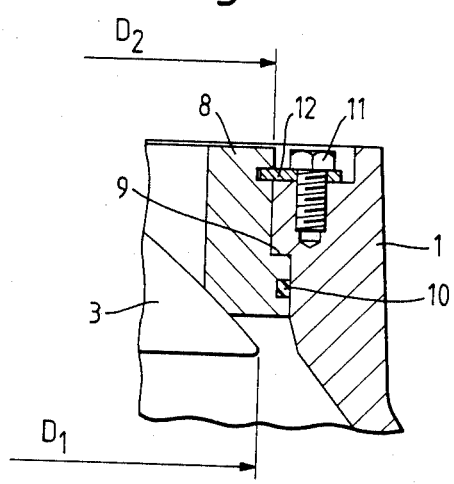
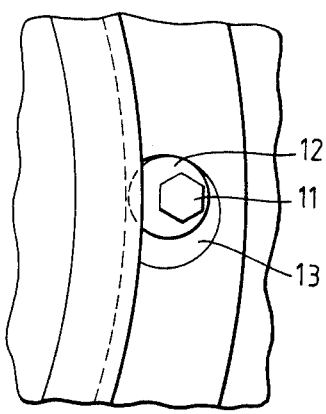
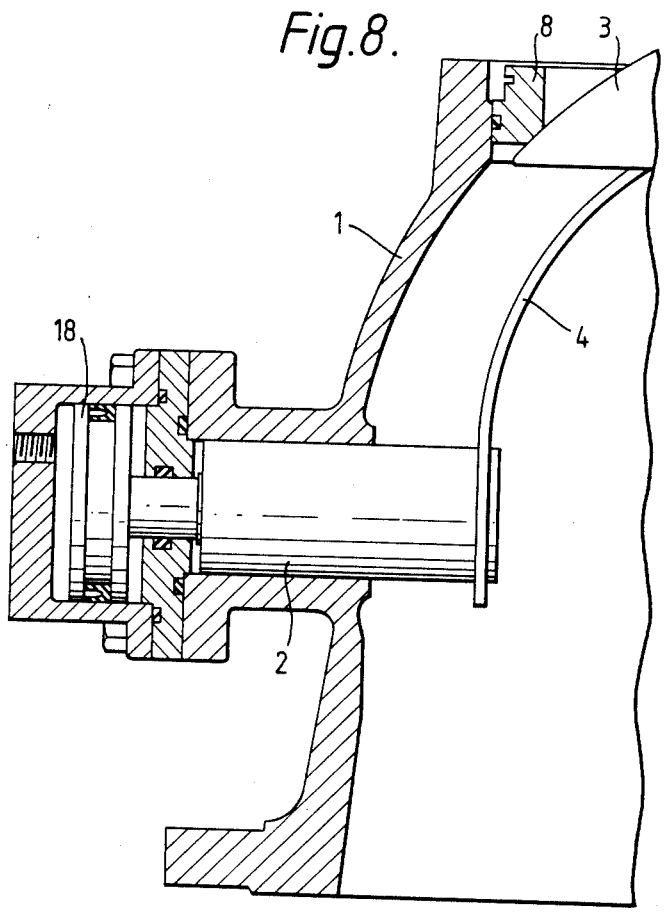

VALVE

BACKGROUND OF THE INVENTION

The present invention relates a valve which consists of a housing provided with a closing opening, a closing member shaped as a part of a ball face which is fitted turnably in the housing and resiliently connected to a pivot shaft, and an annular sealing face.

A valve constructed according to the present invention is in particular suitable for closing the filling opening of a batchwise pulp digester or of a similar pressurized container.

On digesters, for closing the filling opening, lids have been used which are attached to the flange placed at the top of the digester by means of eyebolts and nuts or by a so-called bayonet mount. The use of eyebolts does not permit automation, so that this method has been abandoned. The bayonet mount has been mechanized so as to be controlled from the control room, but it is a drawback of this equipment that the lid cannot be sealed reliably. Chips and other contaminations may remain between the lid and the sealing faces of the digester and cause leakages, in particular so because the internal positive pressure in the digester tends to open the joint.

In view of eliminating these drawbacks, at present, a closing member of the globe valve type is used most commonly. A globe valve can be mechanized easily, and it operates without control, because it is closed reliably, i.e. it is capable of cutting off the feed column in the feed funnel if required, and it is reasonably well sealed, in particular so since the positive pressure in the digester presses the closing member against the seal.

The conventional globe valve constructions which are used as lid valves involve drawbacks which make the valves expensive. For example, the use of a symmetric spherical closing member is expensive owing to the high material and machining costs. In the digesting, chemicals are used which are condensated on colder faces and form hard solid deposits. Owing to the risk of deposits, the sealing member is, as a rule, locked as immobile in order that a deposit that might cause a leakage should not be formed between the seal and the housing. Thereat, the initial surface pressure between the closing member and the closing seal has been produced by means of various so-called tipping devices, which press the closing member against the seal. These additional members cause costs and require servicing. The servicing of a valve of the type described above is difficult and slow at the site of installation, whereby the digester is out of operation and the losses from standstills are high. Nor is it easy to use a replacement valve, for the detaching and installing of the valves and the reconnecting of the various feed, wash, and measurement connections take time.

SUMMARY OF THE INVENTION

The object of the present invention is to eliminate the above drawbacks. The valve in accordance with the invention is characterized in that the closing member is connected to its pivot shaft by means of a resilient member mounted on the pivot shaft.

The advantages of the valve in accordance with the present invention as compared with the prior-art valves are as follows:

closing member of low weight and low cost for a large valve;

simple manufacture of a closing member for a large valve, the location and the contact pressure of the closing member are adjustable, the precision of manufature of the members may be less strict than in conventional valves, owing to the resilient support, it is possible to use an eccentric construction, whereat it is simple to produce the sealing pressure, or owing to the resilient support, alternatively, it is possible to use a centric construction, in which case the sealing pressure can be developed slightly before the final closing position by pushing the shaft inwards by means of a mechanical cam or a wedge face.

owing to the resilient support, it is, alternatively, possible to use a centric or eccentric construction to which an external hydraulic or pneumatic working cylinder is connected, by means of which a sufficient initial sealing pressure is produced in the closing position, movements of thermal expansion of the valve do not interfere with the operation of the valve, the housing of the valve can be manufactured as one part, whereby no problems of sealing of the division plane of the housing occur and a construction of low weight is obtained, the seal can be replaced without dissassembling the valve, the closing member can be replaced without detaching the valve.

BRIEF DESCRIPTION OF THE DRAWINGS

The invention and its details will be described in more detail in the following with reference to the attached drawings, wherein FIG. 6 is a vertical sectional view of the joint between the closing member and the seal at the fastening screw of the seal, FIG. 7 shows a detail in FIG. 6 viewed from above, and FIG. 8 shows an alternative embodiment of the setting adjustment member.

DETAILED DESCRIPTION OF THE PREFERRED EMBODIMENT

Figure 1:
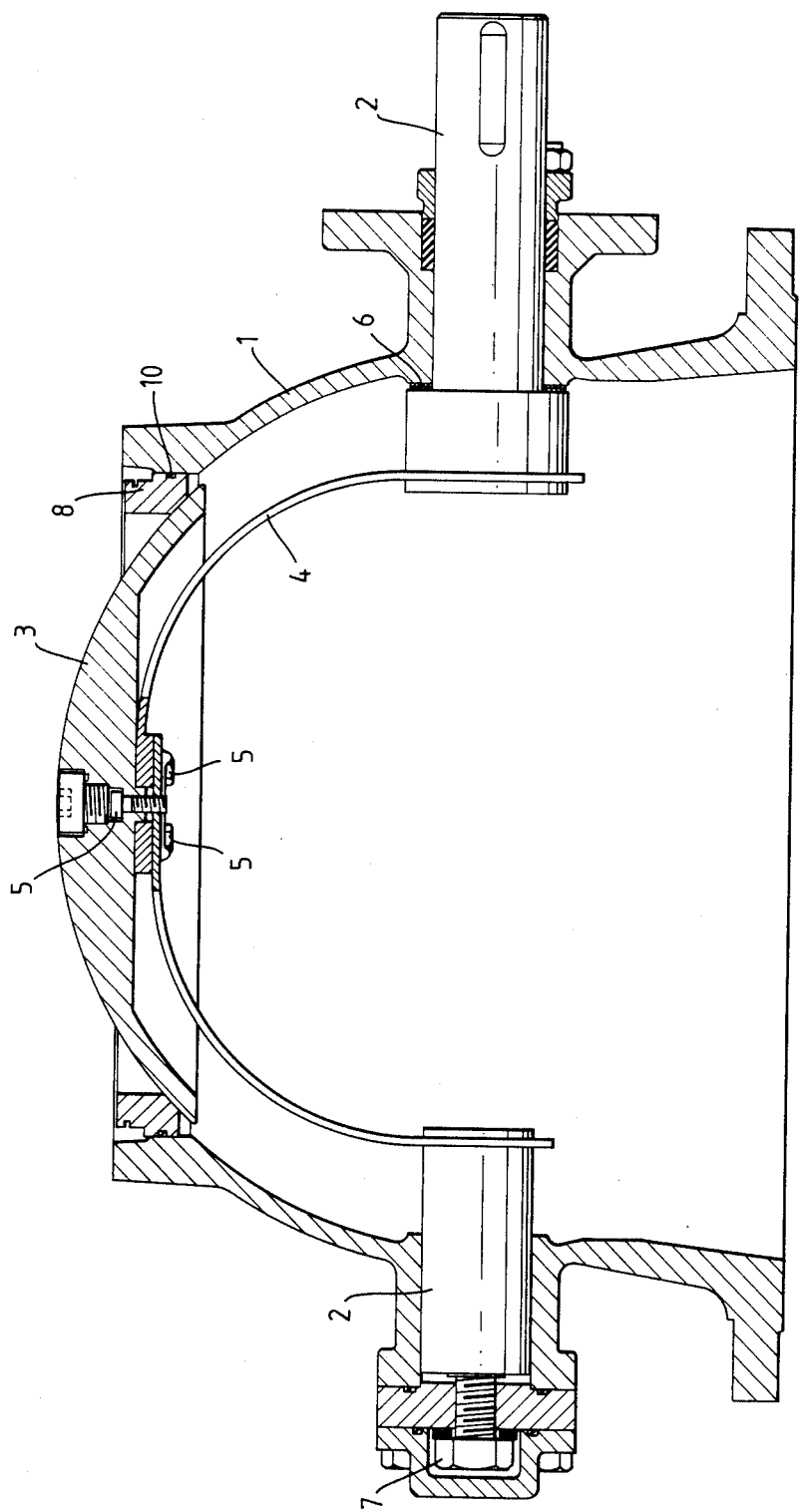
FIG. 1 shows a vertical section through the valve in accordance with the invention in the direction of the pivot shaft.

The valve in accordance with the invention comprises a housing 1 and a pivot shaft 2 mounted on the housing and consisting of two parts. The closing member 3, whose closing face is formed by a segment of a sphere, is attached to the pivot shaft 2 by means of a resilient bracket 4. As is seen from FIG. 2, the closing member is attached to the bracket somewhat eccentrically relative the pivot shaft. The curved bracket 4 consists of two flat bar steels, one of whose ends are fixed to the inner ends of the components of the pivot shaft 2, whereas the other ends are fixed detachably to the inner face of the closing member by means of screws 5.

The curved bracket 4 may also be formed as a continuous arc made of flat bar steel, which is detachably attached to the inner ends of the components of the pivot shaft 2. The closing member is detachably attached to the topmost point of the arc by means of screws.

If desired, a desired number of adjusting washers 6 are fitted between the shoulder of one component of the pivot shaft 2 and the valve housing 1, by means of which the axial position of the pivot shaft 2 (and, accordingly, of the closing member 3) is adjusted. In the other component of the pivot shaft 2, at the outer end, there is an adjusting screw 7, by means of which it is possible to perform a fine adjustment of the initial surface pressure between the closing member and the seal ring.

Figure 2:
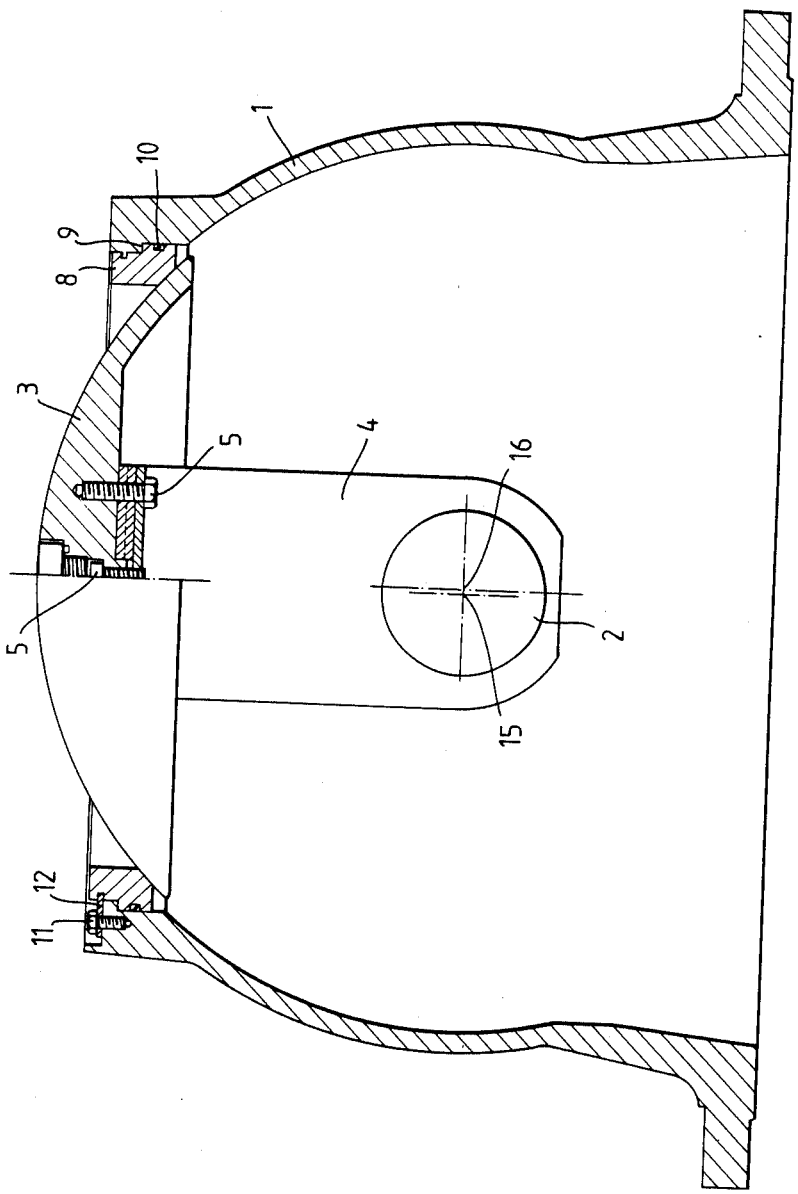
FIG. 2 shows a vertical section through the same valve in a direction perpendicular to the pivot shaft.
Figure 3:
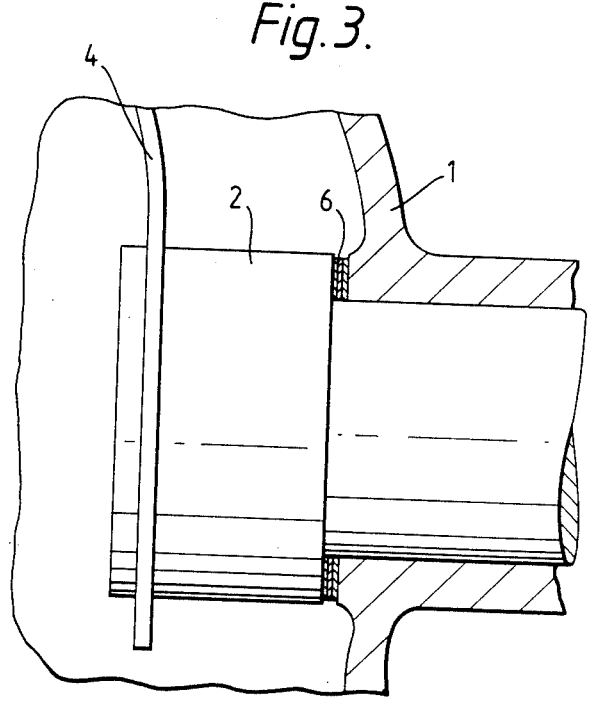
FIG. 3 is an enlarged view of a detail of FIG. 1 at the joint between the pivot shaft and the housing.

Between the closing member 3 and the housing 1, a metallic seal ring 8 is fitted. The housing has an annular shoulder 9, against which a corresponding shoulder of the seal ring rests when the pressure in the digester presses the closing member 3 outwards (FIGS. 2 and 6). Moreover, between the seal ring 8 and the housing 1, there is a seal, e.g. an O-ring 10. The diameter $D_1$ of the closing member is smaller than the smallest diameter $D_2$ of the closing opening (FIG. 6).

The seal ring is suspended in the housing by means of fastening bolts 11 and fastening discs 12 placed eccentrically underneath the said bolts (FIGS. 2 as well as 6 and 7). A necessary number of these bolts and discs are provided for the seal ring. Around the fastening disc 12, there is a recess 13 in the body of the housing, in which said recess the disc 12 can pivot. In its outwardly pivoted position, the disc projects from the face of the body and penetrates into a groove 17 in the seal ring, thereby supporting the seal ring.

Figure 4:
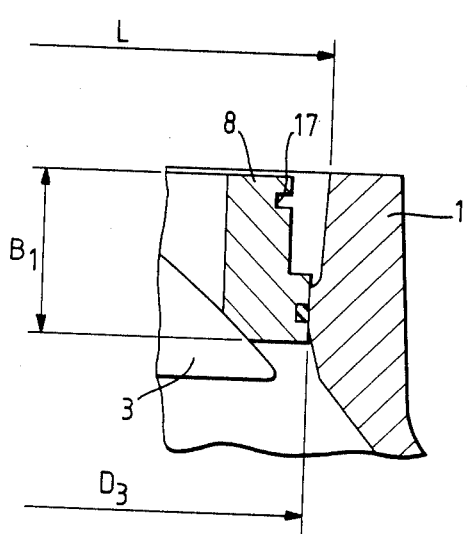
FIG. 4 shows a detail in FIG. 1 at the joint between the closing member and the seal.
Figure 5:
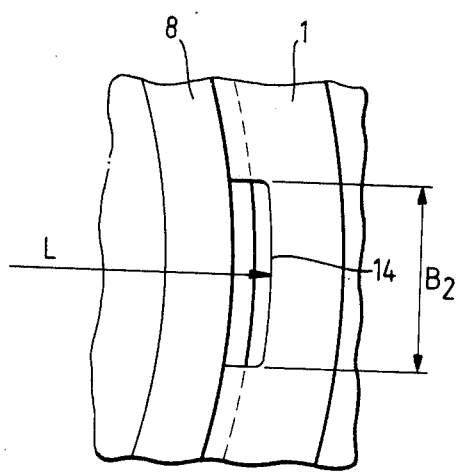
FIG. 5 shows a detail in FIG. 4 viewed from above.

In the housing 1, on the circumference of the closing opening, facing the shoulder 9, in the plane of the pivot shaft, defined are two opposing recesses 14 (FIGS. 4 and 5). The distance L of the bottoms of the recesses, placed one opposite the other, is somewhat larger than the maximum outer diameter $D_3$ of the seal ring 8, and the width $B_2$ of the recesses is larger than the height $B_1$ of the seal ring.

The resilient fastening of the closing member 3 by means of the bracket 4 as well as the possibility of axial adjustment of the pivot shaft 2 permit that the closing member is positioned concentrically with the seal ring 8, whereby good sealing is achieved.

Since, according to FIG. 2, the central axis 15 of the pivot shaft 2 has been shifted slightly to the side from the centre point 16 of the closing member 3, at the final stage of the closing movement of the closing member (anti-clockwise in FIG. 2), by means of the eccentricity, a tightening of the closing member against the sealing ring 8 is achieved. Correspondingly, at the beginning of the opening movement (clockwise in FIG. 2), the compression between the closing member and the seal ring is first released, whereby, in the end part of the movement, no rubbing caused by friction occurs.

When necessary, the seal ring can be replaced easily by pivoting the fastening discs 12 out of the groove 17 in the seal ring. Hereupon the seal ring can be turned to the vertical plane parallel to the shaft 2 (after the closing member has been pivoted from the closed position shown in the figures over 90° to the open position) and be lifted out through the recesses 14. Thus, the seal ring can be removed even though the housing has not been divided into two detachable halves by means of a vertical division plane.

Hereupon the screws 5 can be detached, and the closing member 3 can also be lifted out through the closing opening. The parts of the pivot shaft 2 with their bracket halves 4 can, hereupon, also be pulled out of the valve.

The invention is not confined to the embodiment described above only, but it may show variation in different ways within the scope of the patent claims. For example, instead of the adjustment screw 7, it is possible to use a pneumatic or hydraulic cylinder 18 (FIG. 8). This cylinder does not act "in the adjusting direction" until the closing member is in the closed position. Before the closing member is again pivoted to the open position, the adjusting member pulls the part of the pivot shaft 2 outwards, thereby detaching the closing member 3 from the seal 8.

The recesses 14 for the removal of the seal ring may, of course, also be located in the closing opening one opposite the other in a position different from the plane of the pivot shaft 2.

What is claimed is:
1. A valve, comprising
    a housing having a closing opening defined therein;
    a closing member shaped as a part of a ball face and fitted turnably within said housing, and having an annular sealing face;
    a seal ring fitted between the closing member and the housing against an annular shoulder provided in the housing such that an axial movement of the seal ring presses the seal ring outwardly against the shoulder, the closing opening being continuous with two opposite recesses defined in said shoulder whose width is larger than an axial height of the seal ring,.the distance between the bottoms of the recesses, placed on opposite the other, being larger than the maximum outer diameter of the seal ring.
2. Valve as claimed in claim 1, further comprising fastening discs pivotally attached to the body of the housing the seal ring being provided with a groove into which said fastening discs penetrate in an outwardly pivoted position.
3. Valve as claimed in claim 2, wherein the fastening discs are eccentrically attached to the body of the housing and around the fastening disc, in the body of the housing, there is a second recess, in which the fastening disc is capable of pivoting.

* * * * *